US007946720B2

(12) United States Patent
Tatehata et al.

(10) Patent No.: US 7,946,720 B2
(45) Date of Patent: May 24, 2011

(54) LIGHT GUIDE SHEET, MOVABLE CONTACT STRUCTURE USING THE LIGHT GUIDE SHEET, METHOD OF MANUFACTURING THE MOVABLE CONTACT STRUCTURE, AND SWITCH USING THE LIGHT GUIDE SHEET AND THE MOVABLE CONTACT STRUCTURE

(75) Inventors: Naoki Tatehata, Kyoto (JP); Tsutomu Aisaka, Osaka (JP); Naoki Sera, Okayama (JP); Yousuke Chikahisa, Hyogo (JP)

(73) Assignee: Panasonic Corporation, Osaka (JP)

( * ) Notice: Subject to any disclaimer, the term of this patent is extended or adjusted under 35 U.S.C. 154(b) by 273 days.

(21) Appl. No.: 12/266,106

(22) Filed: Nov. 6, 2008

(65) Prior Publication Data

US 2009/0133594 A1 May 28, 2009

(30) Foreign Application Priority Data

Nov. 22, 2007 (JP) ................................. 2007-302680
Jan. 24, 2008 (JP) ................................. 2008-013303

(51) Int. Cl.
*H04M 1/22* (2006.01)
*H01H 9/18* (2006.01)
*H01H 13/83* (2006.01)

(52) U.S. Cl. .......... 362/24; 200/310; 200/314; 200/317; 341/22

(58) Field of Classification Search .................. 200/5 A, 200/516, 310–317; 341/22, 23, 28; 345/168–171; 362/27, 85, 555, 109, 615, 625, 95, 24; 455/550.1, 455/90.2; 400/484–487
See application file for complete search history.

(56) References Cited

U.S. PATENT DOCUMENTS

| | | | | |
|---|---|---|---|---|
| 5,986,228 A | * | 11/1999 | Okamoto et al. | ............. 200/516 |
| 6,548,778 B2 | * | 4/2003 | Takahashi | ..................... 200/516 |
| 6,604,278 B2 | * | 8/2003 | Sera et al. | ........................ 29/622 |
| 6,765,503 B1 | * | 7/2004 | Chan et al. | ....................... 341/22 |
| 7,350,285 B2 | * | 4/2008 | Mitsuoka et al. | .............. 29/622 |

(Continued)

FOREIGN PATENT DOCUMENTS

CN 1917113 A 2/2007

(Continued)

OTHER PUBLICATIONS

Chinese Office Action issued in Chinese Patent Application No. CN 200810182326.5 dated May 28, 2010.
Supplemental European Search Report Issued in European Patent Application No. EP 08169634.6-1234 dated Mar. 5, 2009.

*Primary Examiner* — Michael A Friedhofer
(74) *Attorney, Agent, or Firm* — McDermott Will & Emery LLP (57) ABSTRACT

A light shielding part includes a slit provided between a first light guide body and a second light guide body, and an attenuation part which has unevenness formed by print and is additionally provided near end sides of the first light guide body and the second light guide body. The light shielding part can prevent light from being transmitted between the first light guide body and the second light guide body. With this configuration, when illumination parts of the first and second light guide bodies are illuminated, it is possible to illuminate the illumination parts of the first and second light guide bodies at different timings without the illumination part of one light guide body being illuminated with light leaked from the other light guide body.

12 Claims, 7 Drawing Sheets

U.S. PATENT DOCUMENTS

| | | | |
|---|---|---|---|
| 7,525,454 B2 * | 4/2009 | Jung et al. | 341/22 |
| 7,534,001 B2 * | 5/2009 | Liu | 362/24 |
| 7,619,173 B2 * | 11/2009 | Inoue | 200/310 |
| 7,677,781 B2 * | 3/2010 | Ishihara et al. | 362/602 |
| 2007/0039809 A1 | 2/2007 | Aihara et al. | |
| 2007/0274102 A1 | 11/2007 | Bohme et al. | |
| 2008/0205032 A1 * | 8/2008 | Liu | 362/24 |
| 2008/0218991 A1 | 9/2008 | Liu | |

FOREIGN PATENT DOCUMENTS

| | | |
|---|---|---|
| EP | 1 840 626 A | 10/2007 |
| JP | 2001-076571 A | 3/2001 |
| JP | 2007-087749 | 4/2007 |
| WO | WO 2008/018416 A | 2/2008 |
| WO | WO 2008/062824 A | 5/2008 |

* cited by examiner

LIGHT GUIDE SHEET, MOVABLE CONTACT STRUCTURE USING THE LIGHT GUIDE SHEET, METHOD OF MANUFACTURING THE MOVABLE CONTACT STRUCTURE, AND SWITCH USING THE LIGHT GUIDE SHEET AND THE MOVABLE CONTACT STRUCTURE

TECHNICAL FIELD

The present invention relates to a light guide sheet, a movable contact structure and a switch for use in various electronic devices.

BACKGROUND ART

In recent years, there have been increasingly proposed techniques in which an operation unit is illuminated to facilitate operation of push buttons and the like even in the dark in various kinds of electronic devices, particularly potable terminals such as mobile phones and the like. In addition, there has been a need for a light guide sheet for providing a variety of illumination and a movable contact structure using the light guide sheet in order to deliver information of caller and so on to device users.

Figure 9:
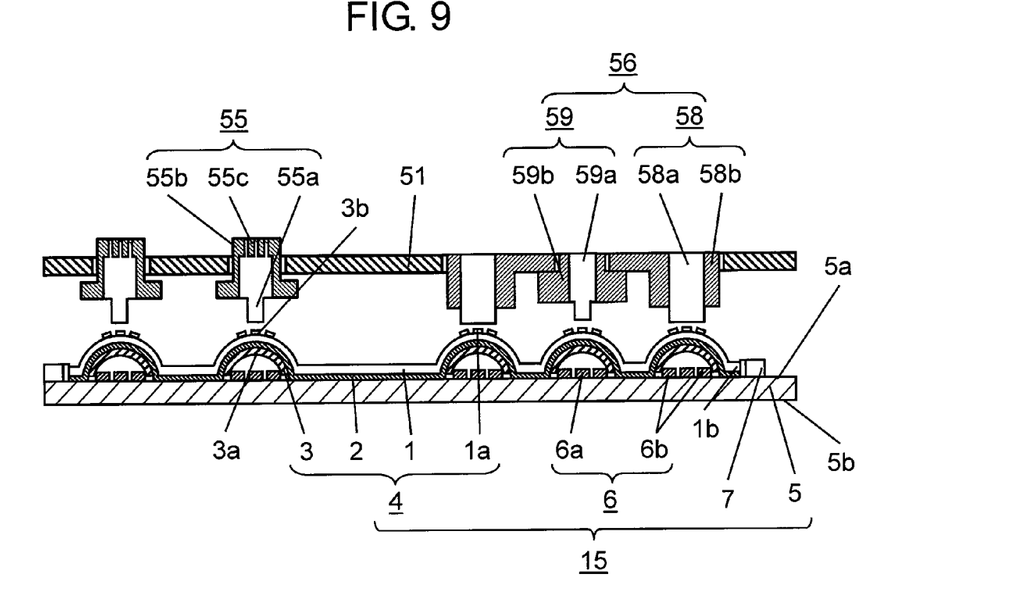
FIG. 9 is a sectional view of a conventional switch.
Figure 10:
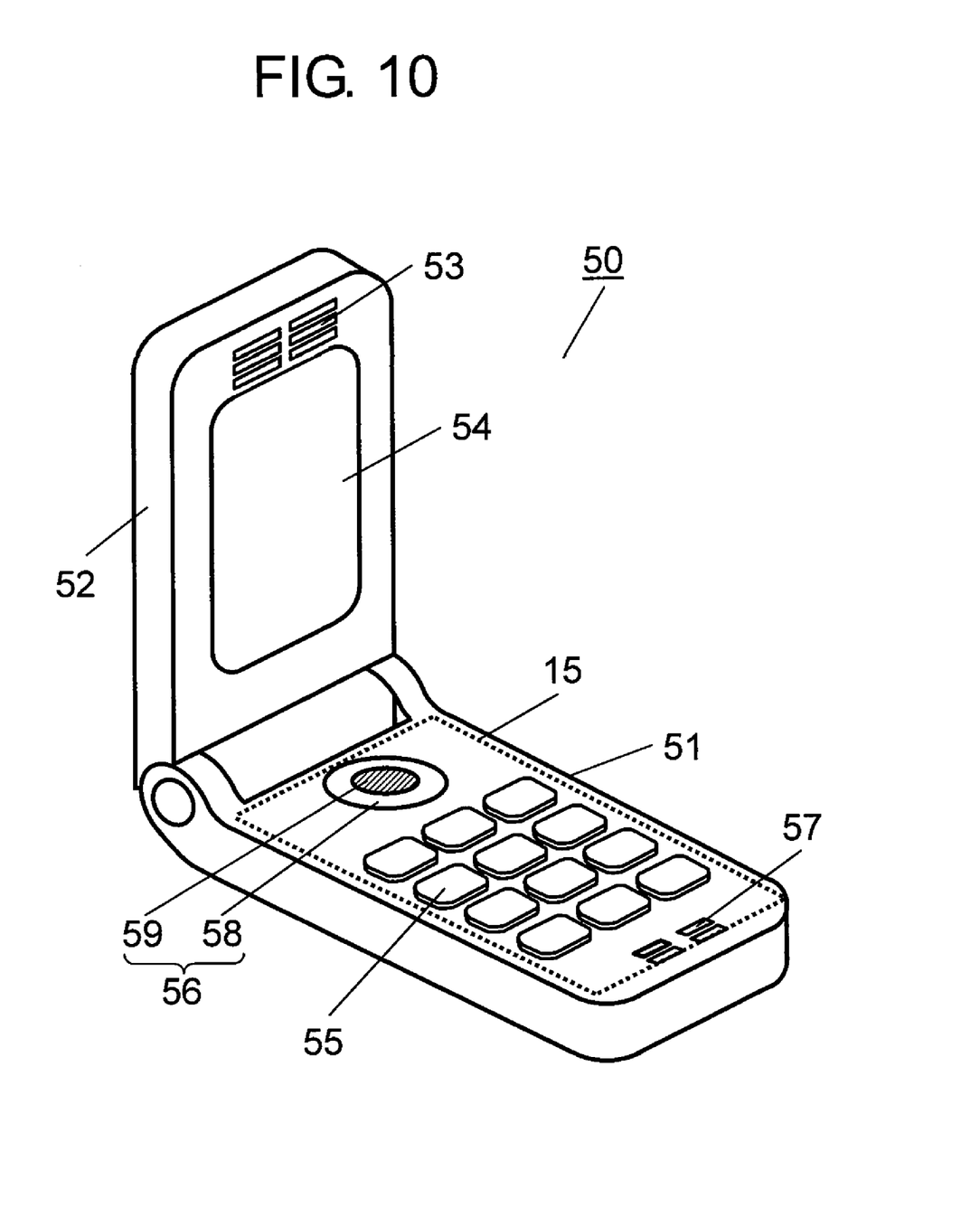
FIG. 10 is a perspective view of a mobile phone using the conventional switch.

FIGS. 9 and 10 show a conventional switch using such a light guide sheet and such a movable contact structure.

In a sectional view of these figures, the dimension in a thickness direction is enlarged for the purpose of ease understandings of configuration.

FIG. 9 is a sectional view of a conventional switch. As shown in FIG. 9, a movable contact structure 4 includes an optically transparent and flexible film-shaped light guide sheet 1 having a plurality of dot-shaped illumination parts 1a formed thereon, a film-shaped base sheet 2 whose peripheral predetermined sites are attached to the bottom side of the light guide sheet 1 by means of an adhesive (not shown), and a substantially dome-shaped movable contact 3 which is formed of a conductive metal thin plate and is attached to the bottom side of the base sheet 2 under the illumination parts 1a.

On the top side 5a of a wiring board 5 are disposed fixed contacts 6, each of which includes a circle-shaped central fixed contact 6a and horseshoe-shaped or ring-shaped outer fixed contacts 6b surrounding the central fixed contact 6a. Light emitting elements 7 such as light emitting diodes or the like are disposed on the top side 5a of the wiring board 5, and a plurality of wiring patterns (not shown) are disposed on the top side 5a and bottom side 5b of the wiring board 5.

A switch 15 is constructed by attaching the movable contact structure 4 to the top side 5a of the wiring board 5 in such a manner that the circumference of the movable contact 3 lies above the outer fixed contacts 6b and a central portion 3a of the bottom side of the movable contact 3 opposes the central fixed contact 6a with a predetermined gap therebetween.

The switch 15 as constructed above is connected to an electronic circuit (not shown) and is incorporated into a fixed housing 51 on which a plurality of dial buttons 55, an operation button 56 and a microphone 57 are disposed, for example, in a clamshell type mobile phone 50, as shown in FIG. 10. In addition, the fixed housing 51 is rotatably connected to a movable housing 52 provided with a speaker 53 and a display unit 54.

As shown in FIG. 9, each of the dial buttons 55 includes a light transmitting part 55a, a light shielding part 55b covering the light transmitting part 55a, and a display part 55c through which the light transmitting part 55a is exposed in a shape of character or symbol.

The operation button 56 is composed of a ring-shaped operation part 58 and a circle-shaped operation part 59. The ring-shaped operation part 58 is composed of a light transmitting part 58a and a light shielding part 58b contacting the light transmitting part 58a. The circle-shaped operation part 59 is composed of a light transmitting part 59a and a light shielding part 59b contacting the light transmitting part 59a.

With the above configuration, when a dial button 55, the ring-shaped operation part 58 or the circle-shaped operation part 59 is pushed, the top side of the light guide sheet 1 is pressed by the lower end of the respective light transmitting part 55a, 58a or 59a. A substantially dome-shaped central portion 3b of the movable contact 3 is pressed accordingly. When a pressing force is applied to the movable contact 3, the movable contact 3 is elastically and inversely recessed downward, so that the central portion 3a of the bottom side of the movable contact 3 contacts the central fixed contact 6a, thereby providing electrical connection therebetween.

Conversely, when the pressing force to the dial button 55 or the operation button 56 is released, the movable contact 3 returns to its original state by elasticity, so that the central portion 3a of the bottom side of the movable contact 3 is detached from the central fixed contact 6a, thereby providing electrical isolation between the central fixed contact 6a and the outer fixed contact 6b.

With such electrical connection/isolation of the fixed contact 6, a device is switched between its functions and power is supplied to from an electronic circuit (not shown) of the device to the light emitting elements 7, thereby emitting light from the light emitting elements 7.

The emitted light is incident from the right end side 1b of the light guide sheet 1 and propagates toward the left side while being reflected within the light guide sheet 1, with some of the light being randomly reflected and being diffused above the illumination parts 1a. Thus, the light is transmitted through each of the light transmitting parts 55a, 58a and 59a of the dial buttons 55, the ring-shaped operation part 58 and the circle-shaped operation part 59 and is diffused upward. Accordingly, top sides of the dial buttons 55, the ring-shaped operation part 58 and the circle-shaped operation part 59 are illuminated.

For example, in the clamshell type mobile phone 50 shown in FIG. 10, when a call is made using the speaker 53 and the microphone 57, light emitting elements (not shown) contained in the fixed housing 51 emit light by being supplied with power from a power source by means of an electronic circuit (not shown). Accordingly, the top sides of the dial buttons 55, the ring-shaped operation part 58 and the circle-shaped operation part 59 are simultaneously illuminated.

The display unit 54 enables display of various setting menus (not shown) of the mobile phone, for example. When a user operates the ring-shaped operation part 58 and the circle-shaped operation part 59 according to the setting menus displayed on the display unit 54, the ring-shaped operation part 58, the circle-shaped operation part 59 and the dial buttons 55 are simultaneously illuminated by means of the electronic circuit (not shown). This provides a mobile phone with high visibility and high operability even in the dark.

As one of prior art documents related to the present invention, for example, Japanese Unexamined Patent Application Publication No. 2007-87749 is known.

However, in the above-described conventional switch, the switch 15 is incorporated in the fixed housing 51 and all of the top sides of the dial buttons 55 and the operation button 56 are simultaneously illuminated with the light emitted from the light emitting elements 7. Therefore, there is a difficulty in achieving a variety of illuminations such as, for example, illuminating the dial buttons 55 and the operation button 56 at different timings.

SUMMARY OF THE INVENTION

To alleviate such difficulty, it is an object of the invention to provide a light guide sheet, movable contact structure using the light guide sheet, a method of manufacturing the movable contact structure, and a switch using the light guide sheet and the movable contact structure, which are capable of providing a variety of illuminations with simple configuration.

According to an aspect of the invention, there is provided a light guide sheet including a transparent first light guide body and a transparent second light guide body, with a light shielding part being provided between the first light guide body and the second light guide body.

With this configuration, it is possible to almost prevent light being transmitted by the light shielding part between the first light guide body and the second light guide body. Accordingly, when light emitting elements for respective light guide bodies emit light, it is possible to prevent an illumination part of one light guide body from being illuminated with light emitted from a light emitting element for the other light guide body. As a result, it is possible to illuminate the illumination parts of the first light guide body and the second light guide body at different timings.

In addition, even when the light emitting elements to illuminate the first light guide body and the second light guide body emit different color light, there is almost no mixture of color, thereby providing a light guide sheet allowing a variety of illuminations with a simpler structure.

According to another aspect of the invention, there is provided a movable contact structure including: the above-described light guide sheet; and a substantially dome-shaped movable contact provided on the bottom side of the light guide sheet and formed of a conductive metal thin plate.

By such a combination of the light guide sheet and the movable contact, it is possible to directly attach a movable contact structure to a wiring board on which a circuit such as a fixed terminal is disposed. Accordingly, it is possible to obtain a movable contact structure suitable for use of the above-described light guide sheet allowing a variety of illuminations.

According to still another aspect of the invention, there is provided a switch including: the light guide sheet; a substantially dome-shaped movable contact provided on the bottom side of the light guide sheet and formed of a conductive metal thin plate; a wiring board having a fixed contact which is formed on the top side of the wiring board and faces the movable contact; and light emitting elements disposed on respective end sides of the first light guide body and the second light guide body.

With this configuration, it is possible to almost prevent light leaked from one light guide body from being incident into the other light guide body, thereby providing a switch suitable for use of the above-described light guide sheet allowing a variety of illuminations.

According to still another aspect of the invention, there is provided a method of manufacturing a movable contact structure, the method including the steps of: attaching a separator below a base sheet to a movable contact, which is formed of a conductive metal thin plate, interposed between the separator and the base sheet; closely adhering the base sheet to the movable contact by hot press from an upper side of the base sheet, forming a first light guide body and a second light guide body on the base sheet, and forming a light guide sheet having a groove provided between the first light guide body and the second light guide body; and filling the groove with ink or applying ink on the groove.

With this configuration, since the groove is formed after forming the first light guide body and the second light guide body on the base sheet, the light guide bodies can be handled simply and conveniently. As a result, it is possible to easily form a movable contact structure suitable for use of the above-described light guide sheet allowing a variety of illuminations.

As described above, the present invention has an advantage of allowing a variety of illuminations with simpler configuration.

DETAILED DESCRIPTION OF PREFERRED EMBODIMENTS

Hereinafter, preferred embodiments of the present invention will be described with reference to the drawings. In sectional views of the drawings, the dimension in a thickness direction is enlarged for the purpose of easy understandings of configuration.

In the drawings, the same elements as those described in BACKGROUND ART are denoted by the same reference numerals, and detailed explanation of which will be omitted.

Embodiment 1

Figure 1:
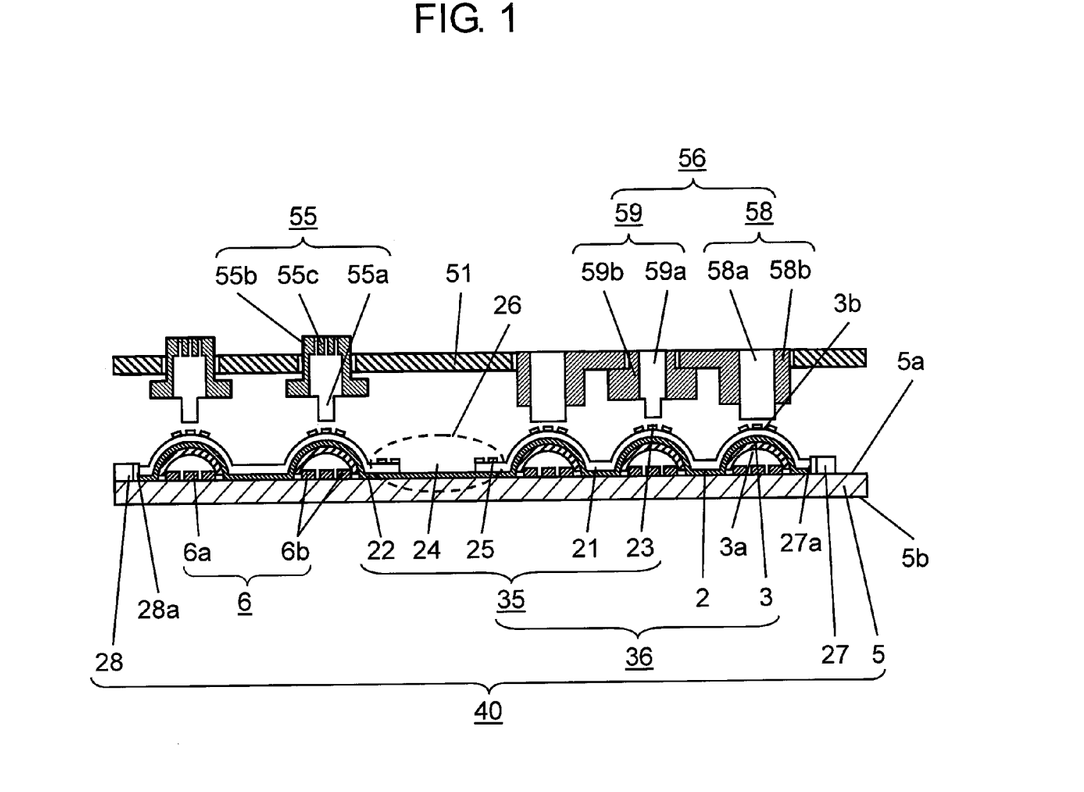
FIG. 1 is a sectional view of a switch according to Embodiment 1 of the present invention.
Figure 2:
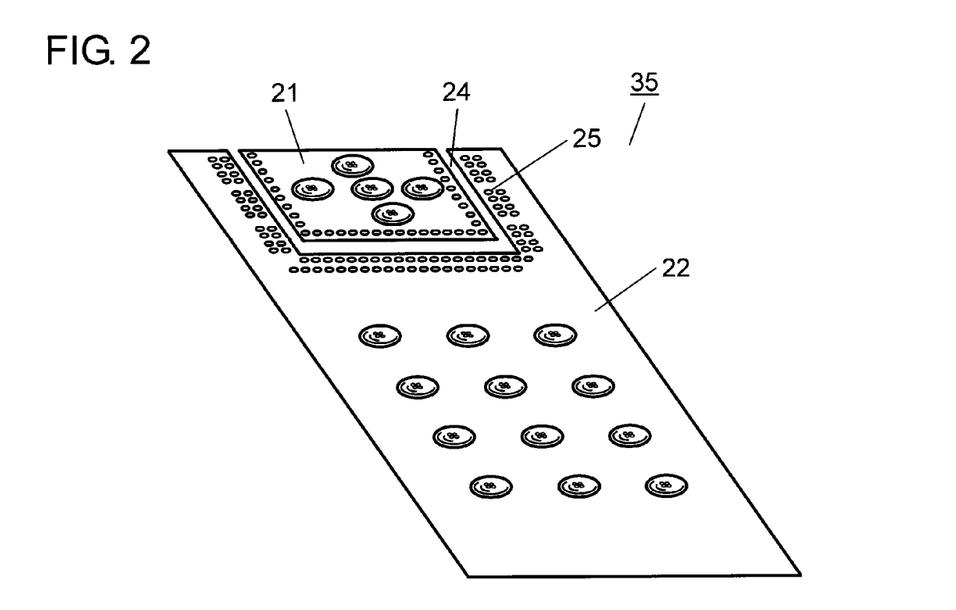
FIG. 2 is a perspective view of a light guide sheet according to Embodiment 1 of the present invention.

FIG. 1 is a sectional view of a switch using a light guide sheet according to Embodiment 1 of the present invention, and FIG. 2 is a perspective view of the light guide sheet according to Embodiment 1.

In FIGS. 1 and 2, a light guide sheet 35 includes first and second insulating light guide bodies 21 and 22 made of polyethyleneterephthalate, polycarbonate, urethane, silicone or the like. A slit 24 is provided to isolate the first light guide body 21 from the second light guide body 22.

On the top sides of the first and second light guide bodies 21 and 22 are provided an illumination part 23 having dot-shaped unevenness formed by printing a plurality of inks, and an attenuation part 25 having similar dot-shaped unevenness. The attenuation part 25 and the slit 24 constitute a light shielding part for shielding light transmitted from the first or second light guide body 21 or 22. In addition, the attenuation part 25 can be formed on bottom sides (not shown) of the first light guide body 21 and the second light guide body 22

The slit 24 has a concave U-shaped depressed structure. 3 sides of the rectangular first light guide body 21 are disposed to face corresponding 3 sides of the second light guide body 22, which are adjacent to the slit 24, with the slit 24 placed between the first and second light guide bodies 21 and 22. The attenuation part 25 is provided near the slit 24 on the top sides of the first and second light guide bodies 21 and 22.

A movable contact structure 36 includes a light guide sheet 35, a film-shaped base sheet 2 whose peripheral predetermined sites are attached to the bottom side of the light guide sheet 35 by means of an adhesive (not shown), and a substantially dome-shaped movable contact 3 which is formed of a conductive metal thin plate and is attached to the bottom side of the base sheet 2 under the illumination part 23.

On the top side of a wiring board 5 are disposed a plurality of fixed contacts 6 and light emitting elements 27 and 28, and a plurality of wiring patterns (not shown) are disposed on the top and bottom sides of the wiring board 5. Here, each fixed contact 6 includes a circle-shaped central fixed contact 6a and horseshoe-shaped or ring-shaped outer fixed contacts 6b surrounding the central fixed contact 6a. The first light emitting element 27 on the wiring board 5 is disposed at a position contacting an end of the first light guide body 21, which faces an emission surface 27a with respect to the first light guide body 21. Likewise, the second light emitting element 28 on the wiring board 5 is disposed at a position contacting an end portion of the second light guide body 22, which faces an emission surface 28a with respect to the second light guide body 22.

A switch 40 is constructed by attaching the movable contact structure 36 to the top side of the wiring board 5 on which the fixed contacts 6 and the light emitting elements 27 and 28 are disposed. Here, the switch 40 is constructed in such a manner that the circumference of the movable contact 3 constituting the movable contact structure 36 lies above the outer fixed contacts 6b on the wiring board 5 and a central portion 3a of the bottom side of the movable contact 3 opposes the central fixed contact 6a with a predetermined gap therebetween.

Figure 3:
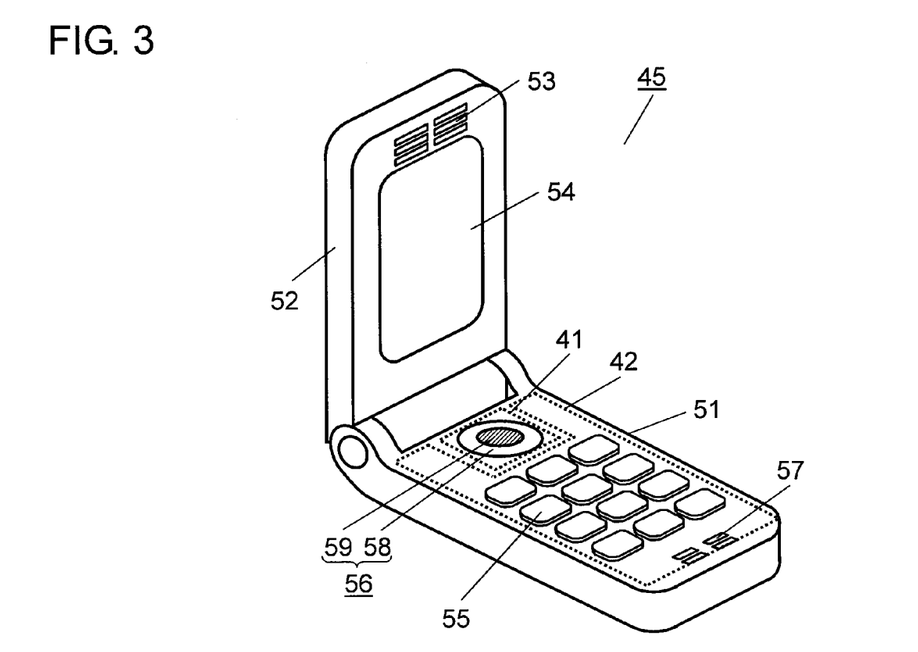
FIG. 3 is a perspective view of a mobile phone using the switch according to Embodiment 1 of the present invention.

The switch 40 as constructed above is incorporated into a clamshell type mobile phone 45, for example, as shown in FIG. 3. As shown in FIG. 3, the switch 40 shown in FIG. 1 is incorporated into a fixed housing 51 of the mobile phone 45 on which dial buttons 55, an operation button 56 and a microphone 57 are disposed. The first light guide body (not shown) is incorporated into a location of a rectangle 41 indicated by a dotted line, and the second light guide body (not shown) is incorporated into a location of a polygon 42 indicated by a dotted line. In addition, the central fixed contact 6a, the outer fixed contacts 6b and the light emitting elements 27 and 28 are electrically connected to an electronic circuit (not shown) of the mobile phone 45 via the wiring patterns (not shown). In addition, the fixed housing 51 is foldably connected to a movable housing 52 provided with a speaker 53 and a display unit 54 at a side contacting the fixed housing 51.

Each of the dial buttons 55 includes a light transmitting part 55a whose bottom side sown in FIG. 1 is located above a central portion 3b of the movable contact 3 and contacts the top side of the second light guide body 22, a light shielding part 55b covering the light transmitting part 55a, and a display part 55c through which the light transmitting part 55a is exposed in a shape of character or symbol.

The operation button 56 is composed of a ring-shaped operation part 58 which is shakable in all directions and a circle-shaped operation part 59 which is movable upward and downward in a central hole of the ring-shaped operation part 58.

The ring-shaped operation part 58 is composed of a light transmitting part 58a whose bottom side contacts the top side of the first light guide body 21 of the central portion 3b of the movable contact 3 and a light shielding part 58b contacting the light transmitting part 58a. The circle-shaped operation part 59 is composed of a light transmitting part 59a whose bottom side contacts the top side of the first light guide body 21 of the central portion 3b of the movable contact 3 and a light shielding part 59b contacting the light transmitting part 59a.

With the above configuration, when a dial button 55 is pushed, the top side of the second light guide body 22 is pressed by the lower end of the light transmitting part 55a. The second light guide body 22 and the base sheet 2 are bent accordingly, thereby pressing the substantially dome-shaped central portion 3b of the movable contact 3. When a pressing force is applied to the central portion 3b of the movable contact 3, the movable contact 3 is elastically and inversely recessed downward with a click feeling, so that the central portion 3a of the bottom side of the movable contact 3 contacts the central fixed contact 6a, thereby providing electrical connection between the central fixed contact 6a and the outer fixed contacts 6b via the movable contact 3.

Conversely, when the pressing force to the dial button 55 is released, the movable contact 3 returns to its original state by elasticity, so that the central portion 3a of the bottom side of the movable contact 3 is detached from the central fixed contact 6a, thereby providing electrical isolation between the central fixed contact 6a and the outer fixed contact 6b.

Likewise, when an outer edge of the ring-shaped operation part 58 is pressed in any direction, the central fixed contact 6a and the outer fixed contacts 6b are electrically interconnected via the movable contact 3 corresponding to the pressing direction. On the contrary, when the pressing force to the ring-shaped operation part 58 is released, the central fixed contact 6a is electrically isolated from the outer fixed contacts 6b. Likewise, when the circle-shaped operation part 59 is pressed, the central fixed contact 6a and the outer fixed contacts 6b are electrically interconnected via the movable contact 3. On the other hand, when the pressing force to the circle-shaped operation part 59 is released, the central fixed contact 6a is electrically isolated from the outer fixed contacts 6b.

The electronic circuit (not shown) detects such electrical connection or isolation between the central fixed contact 6a and the outer fixed contact 6b. In addition, power is supplied to the first light emitting element 27 or the second light emitting element 28 shown in FIG. 1 by means of the electronic circuit.

When power is supplied to the first light emitting element 27 so that the first light emitting element 27 emits light, the light emitted from the first light emitting element 27 is incident from the right end of the first light guide body 21 and propagates to the left side while being reflected inside the first light guide body 21. The propagating light is diffused and reflected by the illumination part 23 on the top side of the light guide body 21 and passes through the light transmitting part 58a of the ring-shaped operation part 58 and the light transmitting part 59a of the circle-shaped operation part 59. As a result, the top sides of the ring-shaped operation 58 and circle-shaped operation part 59 are illuminated from a lower side with the light from the first light emitting element 27.

Next, the light propagating to the left side within the first light guide body 21 is diffused near the slit 24 since unevenness is provided as the attenuation part 25 on the top side of the first light guide body 21. Thereby, since the light is diffused and reflected from the top side of the attenuation part 25 to the outside, the light incident from the right end of the first light guide body 21 is attenuated by the attenuation 25.

Since the light emitted from the first light emitting element 27 is attenuated in this manner, there is little leakage of light from the left end of the first light guide body 21. In addition, since the slit 24 is provided, even when light is a little leaked from the left end of the first light guide body 21, this light is diffused in the air, thereby preventing the light from being incident from the end side of the second light guide body 22.

On the other hand, when power is supplied to the second light emitting element 28 by means of the electronic circuit (not shown) so that the second light emitting element 28 emits light, likewise, the light emitted from the left end of the second light emitting element 28 is incident into the second light guide body 22 and propagates to the right side while being reflected inside the second light guide body 22. The propagating light is diffused and reflected by the illumination part 23 on the top side of the second light guide body 22 and illuminates the light transmitting part 55*a* from a lower side. At this time, since the light is reflected or diffused by the illumination part 23, the light emitted from the second light emitting element 28 is attenuated.

In addition, since the light propagating inside the second light guide body 22 is diffused by a plurality of illumination part 23 and then is diffused and reflected by the attenuation part 25 near the right end, there is little leakage of light from the right end of the second light guide body 22. In addition, for example, even when light is a little leaked from the right end of the second light guide body 22, this light is diffused into the air by the slit 24, thereby preventing the light from being incident into the first light guide body 21.

Accordingly, light can be prevented from being leaked into the second light guide body 22 while the first light emitting element 27 emits the light. Furthermore, light can be prevented from being leaked into the first light guide body 21 while the second light emitting element 28 emits the light. Thereby, the top side of the dial button 55 at the second light guide body 22 side can be prevented from being illuminated while the first light emitting element 27 emits the light. On the other hand, the top side of the operation button 56 at the first light guide body 21 side can be prevented from being illuminated while the second light emitting element 28 emits the light.

In other words, the light emitted from the first and second light emitting elements 27 and 28 is sufficiently attenuated by the light shielding part 26 composed of the slit 24 and the attenuation part 25. Accordingly, the light shielding part 26 prevents the top side of the dial button 55 from being illuminated with the light emitted from the first light emitting element 27 while preventing the top side of the operation button 56 from being illuminated with the light emitted from the second light emitting element 28.

In addition, for example, if the first light emitting element 27 emits red light and the second light emitting element 28 emit white light, the light shielding part 26 can prevent the red and white light from being mixed in the first light guide body 21 and the second light guide body 22, respectively.

When the switch of the present invention above constructed above is used for, for example, the clamshell type mobile phone 45 shown in FIG. 3 and the operation button 56 is pushed, for example, the first red light emitting element 27 emits the red light, the emitted red light propagates into the first light guide body 21 and is diffused by the illumination part 23, and the operation button 56 is illuminated with red color.

When the dial button 55 is pushed, for example, the second white light emitting element 28 emits the white light, the emitted white light propagates into the second light guide body 22 and is likewise diffused by the illumination part 23, and the dial button 55 is illuminated with white color.

Thus, the illumination of the operation button 56 and the dial button 55 has no effect on each other, there is no leakage of light propagating into different light guide bodies and hence no visibility to a user, and there is no mixture of light. Thereby, it is possible to achieve a variety of illuminations by combinations of the operation button 56 and the dial button 55.

Although it has been illustrated in the above description that the attenuation part 25 and the illumination part 23 lie on the top sides of the first light guide body 21 and the second light guide body 22, they may be provided on the bottom side of the first light guide body 21 and the second light guide body 22. When they are provided on the bottom side, light is reflected and diffused at the position of the attenuation part 25 and the illumination part 23 and it is possible to obtain an effect of isolating light between the first light guide body 21 and the second light guide body 22, similarly to when they are provided on the top side.

In addition, with only one of the slit 24 and the attenuation part 25 as the light shielding part 26, it may be possible to obtain an effect of isolating light between the first light guide body 21 and the second light guide body 22. However, with a combination of the slit 24 and the attenuation part 25, it is possible to more effectively isolate light between the first light guide body 21 and the second light guide body 22.

It has been illustrated in the above description that the attenuation part 25 near the end sides of the first light guide body 21 and the second light guide body 22 is formed by printing. However, the attenuation part 25 may be formed to have unevenness by pressing the neighborhood of the end sides using a metal mold with unevenness.

It has been illustrated in the above description that the slit 24 is provided to have the "U"-shape between the first light guide body 21 and the second light guide body 22. However, the slit 24 is not limited to the "U"-shape, but may be formed between rectangular first and second light guide bodies 21 and 22 which are isolated from each other.

According to this embodiment, the light shielding part 26 composed of the slit 24 and the attenuation part 25 is provided between the first transparent light guide body 21 and the second transparent light guide body 22. Thereby, it is possible to illuminate the illumination part 23 of the light guide bodies at different timings without the illumination part 23 of one light guide body being illuminated with light leaked from another light guide body. In addition, even when the light emitting elements 27 and 28 to illuminate the respective light guide bodies emit different color light, these lights can't be mixed inside each light guide body, thereby providing a light guide sheet allowing a variety of illuminations, and a movable contact structure and a switch suitable for use with the light guide sheet with a simpler structure.

Embodiment 2

Figure 4:
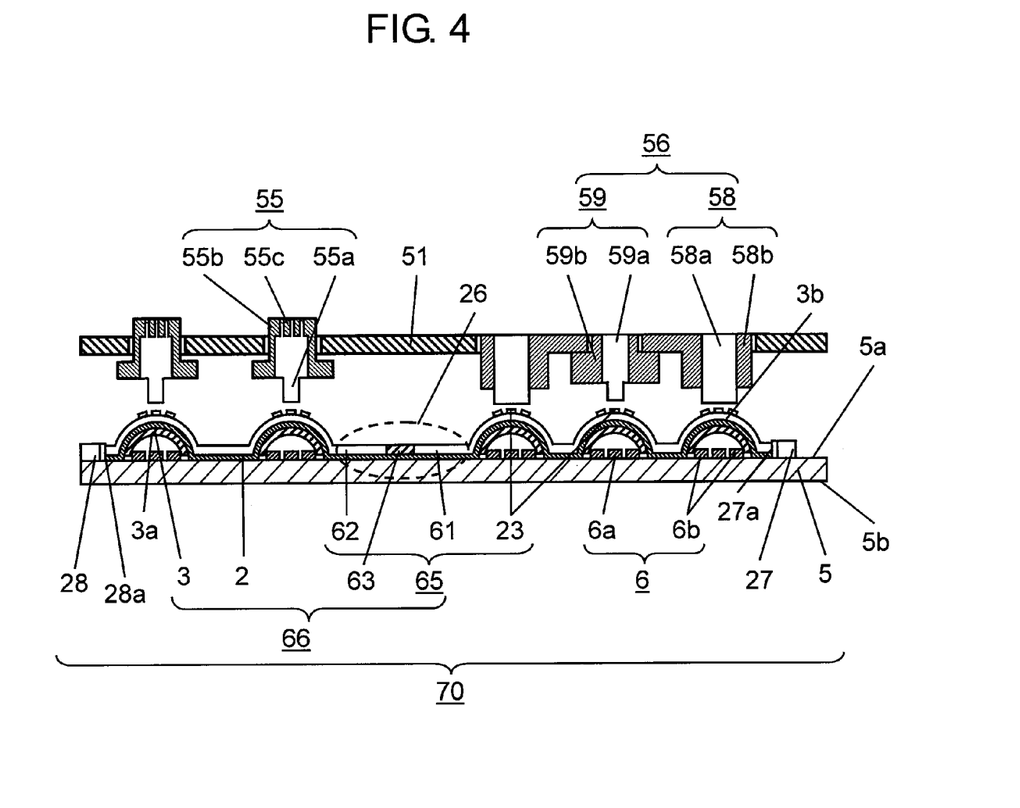
FIG. 4 is a sectional view of a switch according to Embodiment 2 of the present invention.

FIG. 4 is a sectional view of a switch using a light guide sheet according to Embodiment 2 of the present invention. As shown in FIG. 4, a light guide sheet 65 includes first and second light guide bodies 61 and 62 made of polyethyleneterephthalate, polycarbonate, urethane, silicone or the like. In this embodiment, like Embodiment 1, the illumination part 23 having dot-shaped unevenness is provided on the top sides of the first light guide body 61 and the second light guide body 62.

In addition, like Embodiment 1, a movable contact structure 66 includes a film-shaped base sheet 2 and a substantially dome-shaped movable contact 3 formed of a conductive metal thin plate. Here, peripheral predetermined sites of the film-shaped base sheet 2 are attached to the bottom side of the light guide sheet 65 by means of an adhesive (not shown). The movable contact 3 is attached to the bottom side of the base sheet 2 under the illumination part 23.

However, while the slit 24 and the attenuation part 25 are provided as the light shielding part 26 in Embodiment 1, Embodiment 2 is different from Embodiment 1 in that the former has the light shielding part 26 including an ink filling part 63 provided by filling ink or the like between the first light guide body 61 and the second light guide body 62, as shown in FIG. 4.

The ink with which the ink filling part 63 is filled uses dispersion of titanium oxide or carbon into polyester or the like. Since the ink used therein shows a useful effect by its color, it is suitable as material of the light shielding part 26. For example, when white ink into which titanium oxide is dispersed is used, since white color has an effect of reflecting light and accordingly reflects light incident from one of the first light guide body 61 and the second light guide body 62 into the ink filling part 63, it prevents the light from propagating into the other light guide body 61 or 62. As another example, when black ink into which carbon is dispersed is used, since black color has an effect of absorbing light and accordingly absorbs light incident from one of the first light guide body 61 and the second light guide body 62 into the ink filling part 63, it prevents the light from propagating into the other light guide body 61 or 62.

Like Embodiment 1, a fixed contact 6 including a circle-shaped central fixed contact 6a and horseshoe-shaped or ring-shaped outer fixed contacts 6b surrounding the central fixed contact 6a, and light emitting elements 27 and 28 are disposed on the top side 5a of a wiring board 5, and a plurality of wiring patterns (not shown) are disposed on the top side 5a and bottom side 5b of the wiring board 5.

In addition, like Embodiment 1, the circumference of the movable contact 3 constituting the movable contact structure 66 is disposed on the outer fixed contact 6b of the top side 5a of the wiring board 5 at a position at which a central portion 3a of the bottom side of the movable contact 3 faces the central fixed contact 6a with a predetermined gap therebetween. The movable contact structure 4 is attached to the top side 5a of the wiring board 5 on which the fixed contact 6 and the light emitting elements 27 and 28 are disposed, thereby forming a switch 70 shown in FIG. 4.

The switch 70 is electrically connected to an electronic circuit (not shown) within the fixed housing 51 of the clamshell type mobile phone 45, for example, as shown in FIG. 3, like Embodiment 1, and therefore detailed explanation of which will be omitted.

Next, a method of manufacturing the above-described movable contact structure 66 and the switch 70 will be described with reference to FIGS. 5A to 7.

Figure 5A:
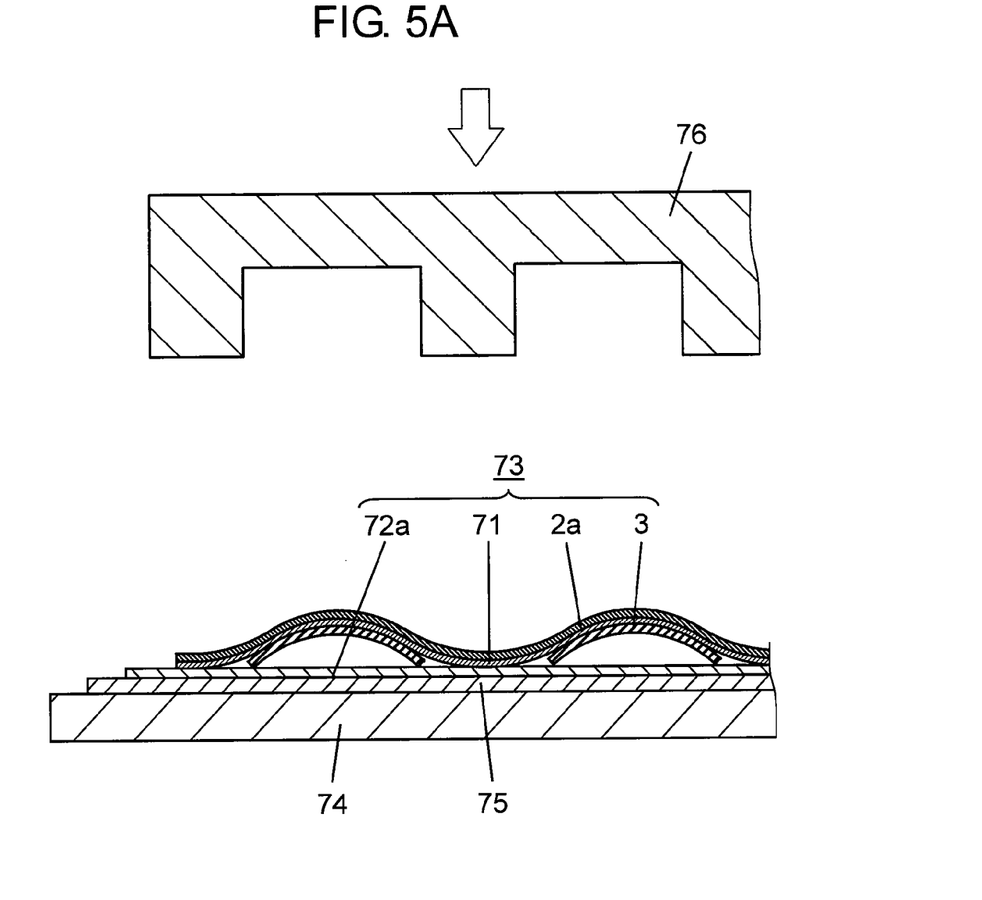
FIG. 5A is a sectional view of a movable contact structure under hot press.
Figure 5B:
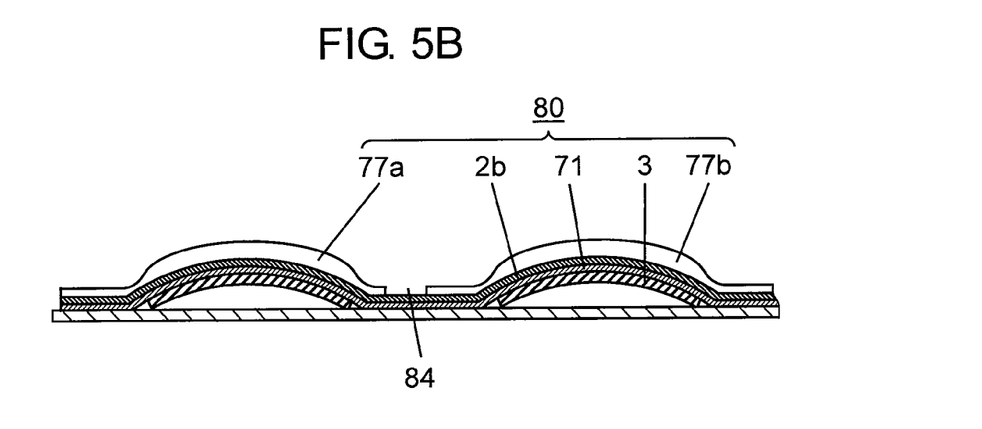
FIG. 5B is a sectional view of a movable contact structure having a groove formed therein.
Figure 6:
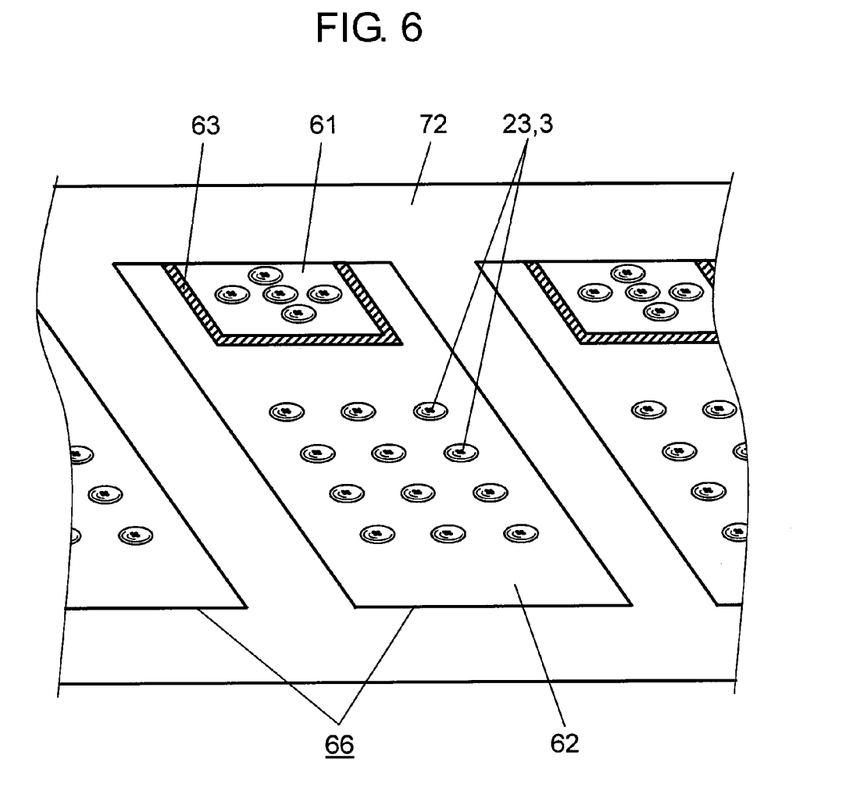
FIG. 6 is a perspective view of a movable contact structure according to Embodiment 2 of the present invention.
Figure 7:
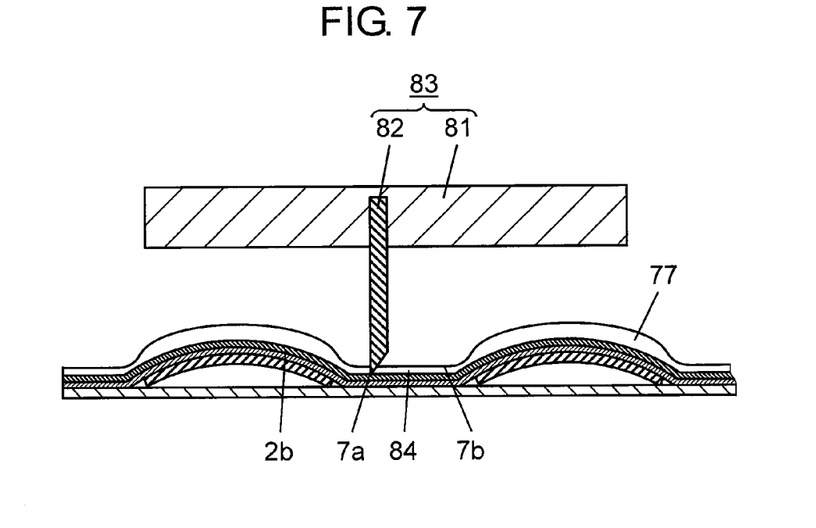
FIG. 7 is a sectional view of a movable contact structure in a case where a groove is formed by a mold.

FIG. 5A is a sectional view of a movable contact structure under hot press and FIG. 5B is a sectional view of a movable contact structure having a groove formed therein. FIG. 6 is a perspective view of a movable contact structure and FIG. 7 is a sectional view of a movable contact structure in a case where a groove is formed by a mold.

First, an adhesive layer (not shown) is printed on an insulating sheet (not shown), which is made of polyethylenterephthalate or the like, by screen printing. By cutting out an external form of the insulating sheet on which the adhesive layer is printed, a base sheet 2a shown in FIG. 5A and a separator 72a made of polyethylenterephthalate or the like is adhered to an adhesive layer 71 with the movable contact 3 interposed therebetween, thereby completing a primary product 73.

Next, as shown in FIG. 5A, for example, a rubber plate 75 having thickness of 1 mm or so is placed on a press base 74, and the primary product 73 is disposed on the rubber plate 75. The primary product 73 is hot-pressed using a mold 76, and then, as shown in FIG. 5B, predetermined sites are adhered on a hot-pressed base sheet 2b by means of an adhesive (not shown) in such a manner that a first light guide body 77a and a second light guide body 77b form a groove 84 for ink filling. In this manner, a secondary product 80 is formed.

Thereafter, the groove 84 formed in the secondary product 80 is filled with ink using a dispenser or the like to form an ink filling part 63 as shown in FIG. 4. In this manner, the movable contact structure 66 of the present invention, which is attached with a separator 72, is manufactured as shown in FIG. 6, for example.

A plurality of movable contact structures 66 is adhesively disposed on the separator 72, as shown in FIG. 6. The ink filling part 63 has a "U"-shape between the first light guide body 61 and the second light guide body 62. An illumination part 23 is formed on each movable contact structure 3.

The movable contact structure 66 is stripped away from the separator 72, and then, as shown in FIG. 4, the stripped movable contact structure 66 is attached to the top side 5a of the wiring board 5 on which the fixed contact 6 and the light emitting elements 27 and 28 are disposed, thereby completing the switch 70. Here, the switch 70 is constructed in such a manner that the circumference of the movable contact 3 constituting the movable contact structure 66 lies above the outer fixed contacts 6b on the top side 5a of the wiring board 5 and the central portion 3a of the bottom side of the movable contact 3 opposes the central fixed contact 6a with a predetermined gap therebetween.

It has been illustrated in the above description that the secondary product 80 is manufactured by attaching the first light guide 77a and the second light guide body 77b to the base sheet 2b. Alternatively, as shown in FIG. 7, the first light guide 77a, the second light guide 77b and the groove 84 for ink filling may be formed on the base sheet 2b using a different method. For example, as shown in FIG. 7, one light guide sheet 77 is placed and is cut up to its bottom at a position 7a and a position 7b by a mold 83 including a base material 81 made of resin and having a groove formed therein and a metal blade 82 fitted into the groove. In addition, by isolating the light guide sheet between the position 7a and the position 7b, the first light guide 77a, the second light guide body 77b and the groove 84 for ink filling are formed on the base sheet 2b.

Although it has been illustrated in the above description that the ink filling part 63 is filled with ink using the dispenser, the ink filling is not limited to this method but may be carried out by other methods. For example, the ink filling part 63 may be formed by filling the groove 84 with ink from the top side of the base sheet 2b using a nozzle by means of an inkjet method. This ink filling method has the same effect as the method of forming the ink filling part 63 using the dispenser. In addition to this effect, it is possible to obtain an effect of forming the ink filling part 63 at a higher speed.

With the above configuration, when the dial button 55, or the ring-shaped operation part 58 or the circle-shaped operation part 59 constituting the operation button 56, as shown in FIG. 4, is pressed, the top side of the light guide sheet 65 is pressed by the bottom side of the respective light transmitting parts 55a, 58a and 59a. The substantially dome-shaped central portion 3b of the movable contact 3 is pressed accordingly. In addition, when a predetermined pressing force is applied to the movable contact 3, the movable contact 3 is elastically and inversely recessed downward, so that the central portion 3a of the bottom side of the movable contact 3 contacts the central fixed contact 6a, thereby providing electrical connection therebetween. Conversely, when the pressing force to the dial button 55 or the operation button 56 is released, the movable contact 3 returns to its original state by elasticity. Thereby, the central portion 3a of the bottom side of the movable contact 3 is detached from the central fixed contact 6a, thereby providing electrical isolation between the central fixed contact 6a and the outer fixed contact 6b, like Embodiment 1.

Like Embodiment 1, such electrical connection/isolation between the central fixed contact 6a and the outer fixed contacts 6b is determined by a controller (not shown) including an electronic circuit (not shown). The controller including the electronic circuit controls emission of the first light emitting element 27 or the second light emitting element 28.

When the controller controls the first light emitting element 27 to emit light, the light emitted from the first light emitting element 27 of FIG. 4 is incident from the right end of the first light guide body 61, propagates toward the left side while being reflected within the first light guide body 61, and is reflected and diffused in the illumination part 23 on the top side of the first light guide body 61.

Next, after being diffused in a plurality of illumination parts 23, the light propagating inside the first light guide body 61 is absorbed by the ink with which the ink filling part 63 of the left end is filled if the ink is black, and is reflected by the ink if the ink is white. Thus, the light propagating inside the first light guide body 61 is sufficiently attenuated, thereby preventing the light from being incident into the second light guide body 62.

On the other hand, likewise, when power is supplied to the second light emitting element 28 to emit light from the second light emitting element 28 by the electronic circuit (not shown) and the controller, the light incident from the left end of the second light guide body 62 is incident into the second light guide body 62. The incident light propagates into the right side while being reflected inside the second light guide body 62, and is diffused and reflected in the illumination part 23 on the top side of the second light guide body 62, and the light transmitting part 55a is illuminated with the light from downward.

In addition, after the light propagating inside the second light guide body 62 is diffused in the plurality of illumination parts 23, it is reflected or absorbed by the ink with which the ink filling part 63 of the right end, thereby preventing the light from being incident into the first light guide body 61.

That is, in order to prevent the light emitted from one of the light emitting elements 27 and 28 from being incident into the other light emitting element 27 or 28 and the other light guide body 61 or 62, the light shielding part 26 is constituted by the ink filling part 63. Accordingly, the light emitted from the light emitting elements 27 and 28 is sufficiently attenuated by the light shielding part 26. As a result, it is possible to prevent the top side of the dial button 55 from being illuminated with the light emitted from the light emitting element 27 and prevent the top side of the operation button 56 from being illuminated with the light emitted from the light emitting element 28.

The switch 70 performing such operation is incorporated and used in the fixed housing 51 of the clamshell type mobile phone 45, for example, as shown in FIG. 3. The illumination operation of the dial button 55 and the operation button 56 when the clamshell type mobile phone 45 is the same as that in Embodiment 1, and therefore, detailed explanation of which will be omitted.

In addition, the ink filling part 63 may be formed by other printing methods such as screen printing. For example, the ink filling part 63 may be formed by forming and fitting colored resin into a groove shape. Such a printing method can also achieve an effect of preventing transmission of light between adjacent light guide bodies, like forming the ink filling part 63 using the dispenser.

It has been illustrated in the above description that the "U"-shaped ink filling part 63 is provided between the first light guide body 61 and the second light guide 62. However, the ink filling part 63 is not limited to the "U"-shape, but, for example, may be formed between rectangular first and second light guide bodies 61 and 62 which are isolated from each other. This configuration can also practice the present invention sufficiently and achieve the same effect of preventing transmission of light between adjacent light guide bodies.

Figure 8:
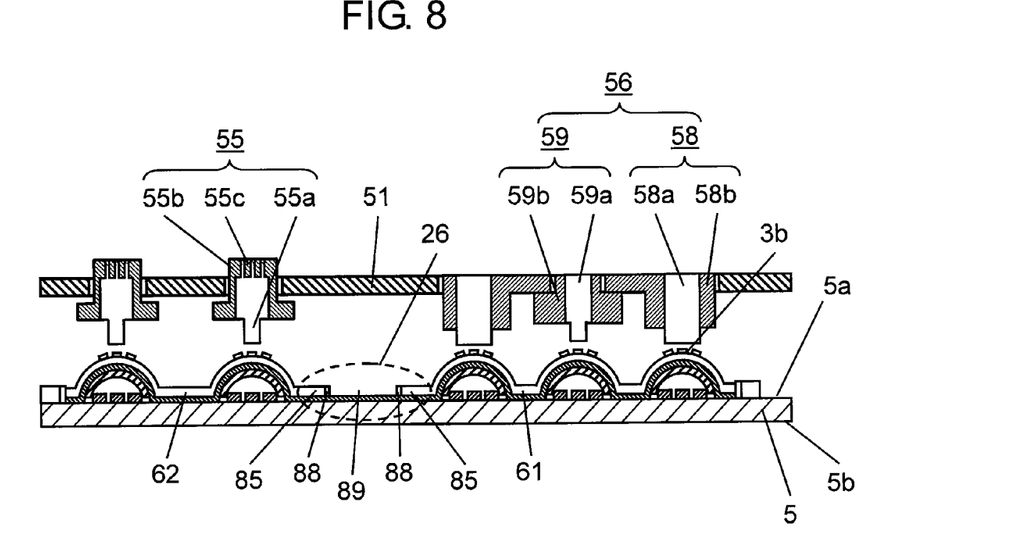
FIG. 8 is a sectional view of another switch according to Embodiment 2.

FIG. 8 is a sectional view of another switch according to Embodiment 2. Instead of providing the ink filling part 63 of the switch of FIG. 4, ink is applied on end portions 85 of the first light guide body 61 and the second light guide body 62 or a film applied with ink is attached to the end portions. This may provide an ink application part 88 and a light shielding part 26 is formed by the ink application part 88 and a slit 89. With this configuration, since light is reflected or absorbed by the ink application part 88 and is diffused into the space by the slit 89, it is possible to form a movable contact structure suitable for preventing light from being transmitted between the first light guide body 61 and the second light guide body 62.

According to this embodiment, the light shielding part is formed by providing an ink filling part or the like between the transparent first light guide body and the transparent second light guide body. With this configuration, an illumination part of one light guide body can be almost prevented from being illuminated with light leaked from the other light guide body. Accordingly, it is possible to illuminate the illumination parts of the first and second light guide bodies at different timings, thereby realizing a light guide sheet allowing a variety of illuminations with a simpler structure.

In addition, the light shielding part is formed by applying ink on end sides of the first light guide body and the second light guide body or filling ink between the first light guide body and the second light guide body. In a light guide sheet having such a light shielding part, light is reflected or absorbed by the ink applied on the end sides of the first light guide body and the second light guide body or the ink with which a groove formed between both of the light guide bodies is filled.

With this configuration, even when a space between the first light guide body and the second light guide body can not be sufficiently secured, it is possible to prevent light from being transmitted between adjacent light guide bodies. This can achieve an effect of providing a smaller light guide sheet allowing a variety of illuminations, and a movable contact structure and a switch suitable for use with the light guide sheet with a simpler structure.

In addition, the light shielding part includes an attenuation part formed on the top sides or the bottom sides of the first light guide body and the second light guide body and a slit provided between the first light guide body and the second light guide body. In a light guide sheet having such a light shielding part, it is possible to illuminate the illumination parts of the light guide bodies at different timings without the illumination part of one light guide body being almost illuminated with light leaked from the other light guide body.

In addition, even when the light emitting elements to illuminate the respective light guide bodies emit different color light, these lights can't be mixed inside each light guide body, thereby providing a light guide sheet allowing a variety of illuminations, and a movable contact structure and a switch suitable for use with the light guide sheet with a simpler structure.

According to this embodiment, a method of manufacturing a movable contact structure includes a first step of attaching a separator below a base sheet to a movable contact, which is formed of a conductive metal thin plate, interposed the separator and the base sheet, a second step of closely adhering the base sheet to the movable contact by hot press from an upper side of the base sheet, forming a first light guide body and a second light guide body on the base sheet, and forming a light guide sheet having a groove provided between the first light guide body and the second light guide body, and a third step of filling the groove with ink or applying ink on the groove.

With this configuration, it is possible to uniformly form an ink filling part a predetermined position on the base sheet. This can make it possible to manufacture a light guide sheet allowing a variety of illuminations and a movable contact structure using the light guide sheet with stability and good yield and with simpler configuration.

In the above described embodiments, the light guide sheet is divided into two, i.e., includes the first light guide body and the second light guide body. In a case where the light guide sheet includes three or more light guide bodies, light shielding parts may be provided between respective adjacent light guide bodies. This configuration can provide an effect of effectively shielding light between the adjacent light guide bodies and hence realizing a movable contact structure and a switch including a light guide sheet allowing a variety of illuminations with a simpler structure.

According to the present invention, the light guide sheet, the movable contact structure using the light guide sheet and the switch using the light guide sheet and the movable contact structure can provide a variety of illuminations with simper configuration, and accordingly are useful for operation of various kinds of electronic devices.

The invention claimed is:

1. A light guide sheet comprising:
a transparent first light guide body; and
a transparent second light guide body, wherein:
a light shielding part is provided between the first light guide body and the second light guide body,
the light shielding part is a slit continuously extending along at least one entire side line of the first light guide body which faces the second light guide body.

2. The light guide sheet of claim 1, wherein:
the light shielding part includes an attenuation part formed on a top surface or a bottom surface of at least one of the first light guide body and the second light guide body,
the attenuation part is disposed at both sides of the slit, and the attenuation part has a printed structure formed by printing.

3. A movable contact structure comprising:
the light guide sheet according to claim 1; and
a substantially dome-shaped movable contact provided on a bottom side of the light guide sheet and formed of a conductive metal thin plate.

4. The movable contact structure of claim 3,
wherein:
the light shielding part includes an attenuation part formed on a top surface or a bottom surface of at least one of the first light guide body and the second light guide body,
the attenuation part is disposed at both sides of the slit, and the attenuation part has a printed structure formed by printing.

5. The light guide sheet of claim 1, wherein the slit continuously extends along three entire side lines of the first light guide body which face the second light guide body so as to physically separates the first and second light guide bodies.

6. A light guide sheet comprising:
a transparent first light guide body;
a transparent second light guide body; and
a light shielding part provided between the first light guide body and the second light guide body, wherein:
the light shielding part includes a slit or a groove, and
the slit or the groove is filled a light shielding material.

7. The light guide sheet of claim 6, wherein the light shielding material is ink or colored resin.

8. A light guide sheet comprising:
a transparent first light guide body;
a transparent second light guide body; and
a light shielding part provided between the first light guide body and the second light guide body, wherein:
the light shielding part includes a slit or a groove, and
ink or colored resin is applied to an end surface of at least one of the first light guide body and the second light body facing the slit or the groove.

9. A movable contact structure comprising:
the light guide sheet according to claim 8; and
a substantially dome-shaped movable contact provided on a bottom side of the light guide sheet and formed of a conductive metal thin plate.

10. A switch comprising:
the light guide sheet according to claim 8;
a substantially dome-shaped movable contact provided on the bottom side of the light guide sheet and formed of a conductive metal thin plate;
a wiring board having a fixed contact which is formed on a top side of the wiring board and faces the movable contact; and
light emitting elements disposed on respective end sides of the first light guide body and the second light guide body.

11. The light guide sheet of claim 8, wherein the slit or groove continuously extends along at least one entire side line of the first light guide body which faces the second light guide body.

12. The light guide sheet of claim 11, wherein the slit or groove continuously extends along three entire side lines of the first light guide body which face the second light guide body.

* * * * *